United States Patent
Bhatia et al.

(10) Patent No.: US 11,232,000 B1
(45) Date of Patent: Jan. 25, 2022

(54) MOVING DATABASE PARTITIONS FROM REPLICA NODES

(71) Applicant: Amazon Technologies, Inc., Seattle, WA (US)

(72) Inventors: Sandeep Bhatia, Bothell, WA (US); Ming-Chuan Wu, Bellevue, WA (US); Kanishka Chaturvedi, Seattle, WA (US); Andrew Whitaker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 444 days.

(21) Appl. No.: 15/441,814

(22) Filed: Feb. 24, 2017

(51) Int. Cl.
*G06F 11/14* (2006.01)
*G06F 16/21* (2019.01)
*G06F 16/27* (2019.01)

(52) U.S. Cl.
CPC ...... *G06F 11/1451* (2013.01); *G06F 11/1464* (2013.01); *G06F 16/214* (2019.01); *G06F 16/278* (2019.01); *G06F 2201/84* (2013.01)

(58) Field of Classification Search
CPC ...... G06F 2201/84; G06F 16/27; G06F 3/067; G06F 3/065; G06F 2201/80; G06F 3/0619; G06F 11/1451; G06F 11/1464; G06F 2201/815; G06F 11/1435; G06F 16/128; G06F 11/1446; G06F 16/2365
See application file for complete search history.

(56) References Cited

U.S. PATENT DOCUMENTS

| | | | |
|---|---|---|---|
| 7,685,109 B1 | 3/2010 | Ransil et al. | |
| 8,090,880 B2 * | 1/2012 | Hasha | G06F 11/1425 709/251 |
| 9,098,453 B2 * | 8/2015 | Griffith | G06F 11/1458 |
| 9,740,762 B2 | 8/2017 | Horowitz et al. | |
| 2004/0059805 A1 * | 3/2004 | Dinker | G06F 11/2069 709/223 |
| 2009/0019312 A1 * | 1/2009 | Kulkarni | G06F 11/3644 714/32 |
| 2012/0166390 A1 * | 6/2012 | Merriman | G06F 16/2365 707/613 |
| 2013/0290249 A1 * | 10/2013 | Merriman | G06F 16/273 707/610 |
| 2015/0019494 A1 * | 1/2015 | Griffith | G06F 11/1458 707/649 |
| 2015/0019909 A1 * | 1/2015 | Griffith | G06F 11/1458 714/15 |
| 2015/0066844 A1 * | 3/2015 | Yin | G06F 9/45558 707/612 |
| 2015/0347548 A1 * | 12/2015 | Mortensen | G06F 16/178 707/618 |

(Continued)

*Primary Examiner* — Angelica Ruiz
(74) *Attorney, Agent, or Firm* — Robert C. Kowert; Kowert, Hood, Munyon, Rankin & Goetzel, P.C.

(57) ABSTRACT

Replicated partitions of a database may be moved from one or more replica nodes to a different primary node. The replica nodes may maintain replicated partitions of one or more primary partitions of a primary node servicing access requests to the primary partitions. The replicated partitions may be copied to a different node in order to cause the processing of access requests directed to primary partitions to be serviced by the different node. Replicated partitions of a database may be moved from replica nodes to perform a split operation or a merger operation.

20 Claims, 13 Drawing Sheets

(56) References Cited

U.S. PATENT DOCUMENTS

2016/0162562 A1\* 6/2016 Hattori .................... G06F 16/22
                                                                                    707/620
2017/0031988 A1\* 2/2017 Sun ................... G06F 16/24554

\* cited by examiner

US 11,232,000 B1

MOVING DATABASE PARTITIONS FROM REPLICA NODES

BACKGROUND

In order to respond to changing conditions or workloads, various kinds of processing environments may rely upon scale out techniques to distribute work amongst additional nodes or merge techniques to distribute work among fewer nodes. For example, as the demands upon various processing resources of a single node increase beyond the capacity of the node to perform according to a desired standard, an additional node may take over some of the workload from the original node so that the performance standard may be maintained. Given that scale out and merge techniques may be widely applicable, improvements to the performance of such techniques are desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to move database partitions from replica nodes, according to some embodiments. Techniques to change the distribution of data that a node is responsible for processing, managing, or otherwise providing access to in a database may leverage the capacity of nodes that replicate the data managed by a node, in one embodiment. Requests to read data from or write data to a database may be handled by a primary node, in one embodiment (e.g., a node that is designated or otherwise assigned to process requests for some or all of a database, including one or more partitions of a database). As this primary node may be responsible processing access requests, attempts to utilize the node for performing other operations may affect the ability of the node to provide access to the database (e.g., by consuming processor capacity, I/O bandwidth, or network bandwidth that could be used for servicing access requests). In one embodiment, replica nodes may replicate the data and operations performed by the primary node. Additional capacity to perform other operations may be available at the replica nodes, which can then be used to move one or more partitions maintained by the primary to another node without burdening the primary node, in one embodiment.

Figure 1A:
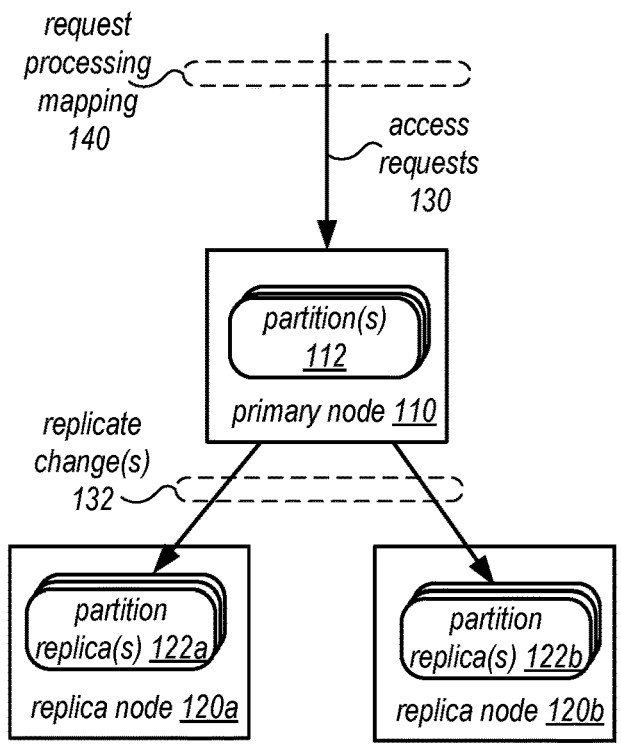
FIGS. 1A-1D are logical block diagrams illustrating moving database partitions from replica nodes, according to some embodiments.

For example, in one embodiment, moving partitions of a database (or a shard of a database) from one node to another can distribute the workload for servicing access request to the database more efficiently. A split operation, for instance, can divide up some of the data managed by a primary node amongst one or more other primary nodes, in one embodiment. A merge operation can consolidate the management of data amongst fewer primary nodes, in one embodiment. FIG. 1A are logical block diagrams illustrating moving database partitions from replica nodes, according to some embodiments, in order to leverage the capacity of replica nodes to perform movement operations.

In FIG. 1A primary node 110 processes access requests 130 to a database stored as one or more partitions 112, in one embodiment. Replica nodes, such as replica nodes 120a and 120b, may store partition(s) (e.g., 122a, and 122b respectively) that are replicas of partition(s) 112, in one embodiment. As primary node 110 receives access requests 130, primary node 130 may replicate changes 132 to the partitions to replica nodes 120a and 120b (which may correspondingly apply the replicated change(s)), in one embodiment. Primary node 110 and replica nodes 120a and 120b may be any kind of processing engine, compute node, or system, such as computer system 2000 discussed below with regard to FIG. 11, in one embodiment. For example, node 110 may be a processing node for a database, in one embodiment as discussed below with regard to FIG. 3.

In one embodiment, partitions, such as partitions 112, of a database may be stored in storage for primary node 110 (e.g., in attached non-volatile storage or volatile storage). Partitions may be determined or identified, according to a logical partitioning scheme, and thus may not be physically stored together as a partition, in one embodiment. For example, a logical partitioning scheme may correspond to individual tables of a database or portions of tables in a database (e.g., where each portion of table is identified by the contents of items within the table, such as rows of the table that include a date field with the same month or year), in one embodiment. In one embodiment, the logical partitioning scheme may include determining or assigning a partition key to data as it is stored in the database. For example, a hash function can be applied to an item value, in one embodiment, in order to generate a partition key. The partition key may then be used to assign the item to a partition (e.g., partition A includes partition keys 1 to 9999, partition B includes partition keys 10000 to 19999, and so on). When data is added to the database, the data may be stored according to an underlying storage scheme, which may not be aware of or account for the logical partitioning scheme, so that data that belongs to different partitions may be comingled in storage locations or units (e.g., files, pages, blocks, or other data structures or objects in storage), in one embodiment.

Request processing mapping 140 may be mapping or other assignment information that describes the processing assignments of nodes and partitions, in one embodiment. For instance, request processing mapping 140 may indicate that primary node 110 is assigned to a subset of partitions of a database (while other primary nodes—not illustrated—may be assigned to process access requests for other partitions of the database). In one embodiment, request processing mapping 140 may be maintained by a request routing layer (e.g., routing servers or other networking devices that intercept access requests for the database). In one embodiment, request processing mapping 140 may be maintained or enforced by primary nodes, such as primary node 110.

Figure 1B:
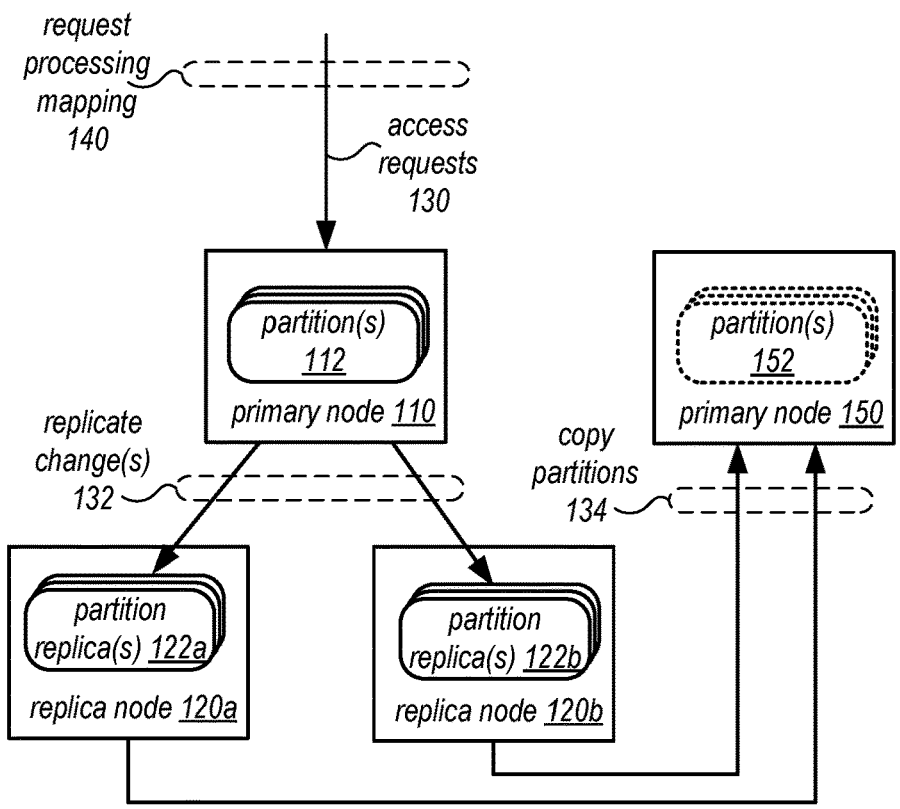
Figure 1C:
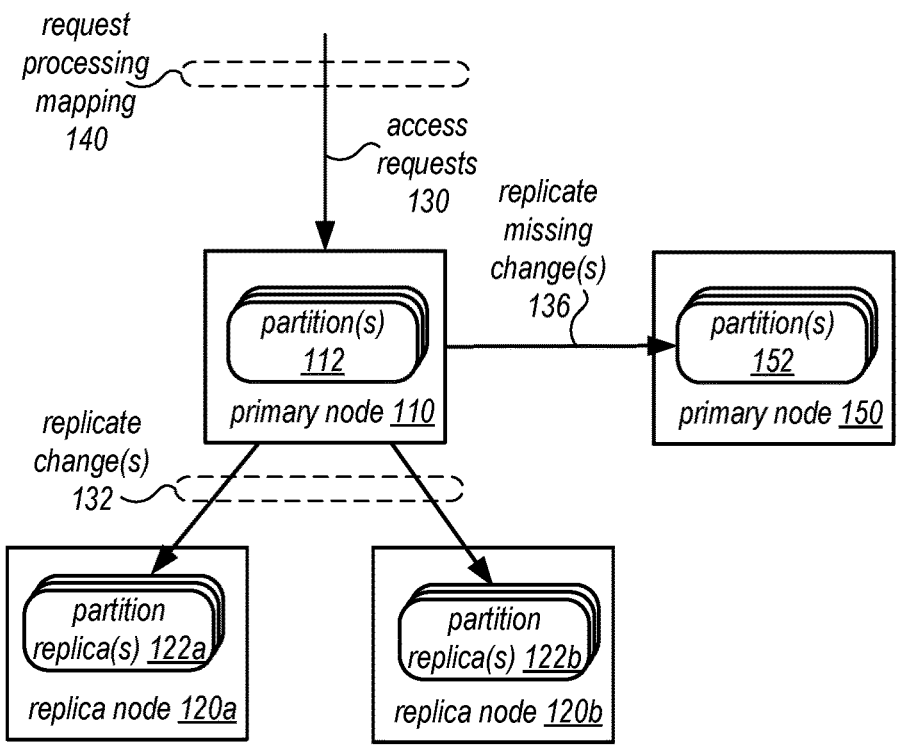
Figure 1D:
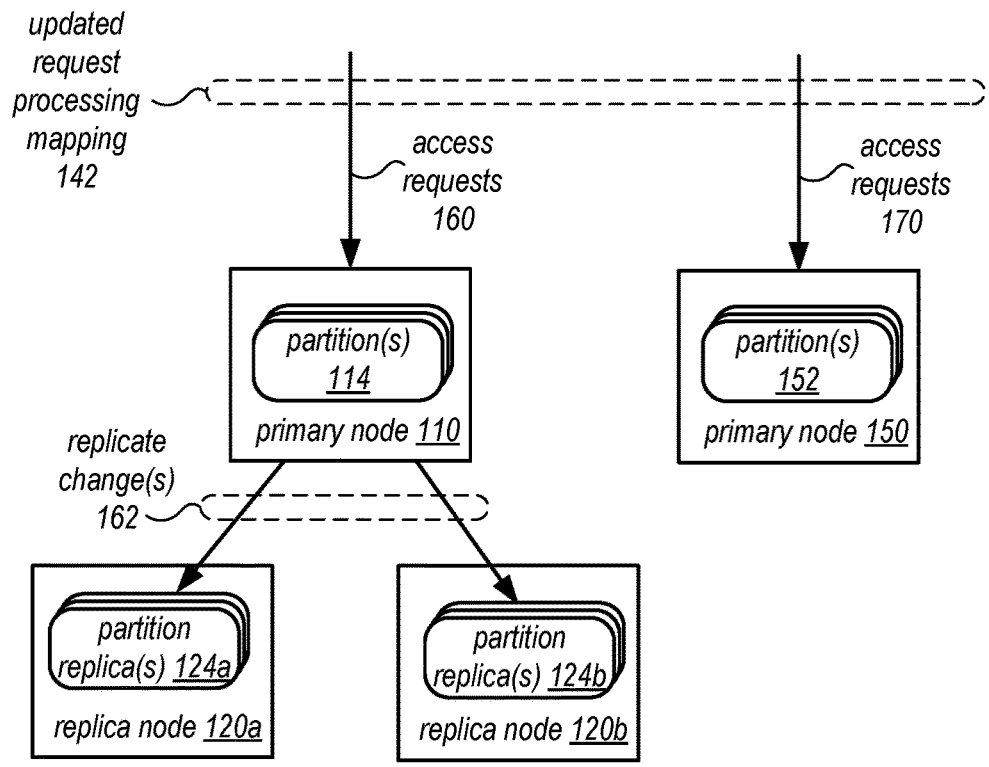

An event or other trigger to move a partition of data may be detected for primary node 110 in various ways. In one embodiment, a split operation, such as is depicted in FIGS. 1B-1D, may split an existing partition (or reassign a subset of a group of partitions assigned to primary node 110) to one or more other nodes. In one embodiment, a merger operation, such as is discussed below with regard to FIGS. 4A and 4B, may be performed A partition movement event may be manually requested (e.g., by receiving a request to split processing at primary node 110 from a client of node 110), in one embodiment. Partition movement events may be automatically detected, in one embodiment. For example, performance metrics for primary node 110 may be collected to determine whether primary node 110 satisfies performance characteristics or criteria. A maximum utilization threshold for processor utilization of primary node 110 could be monitored based on the performance metrics, in one embodiment. If the maximum utilization threshold is exceeded, then a partition movement event may be triggered for primary node 110.

Once triggered an evaluation may be performed to determine or select the partition(s) to move from primary node 110, in one embodiment. Random partition selection may be implemented in one embodiment, while in another embodiment deterministic techniques may be performed to select the partition to move. For example, metrics collected for individual partitions may be evaluated to select a most accessed partition (or a group of partitions that are accessed collectively as much as the most access partition) to move, in one embodiment.

In FIG. 1B, primary node 150 has been identified as a target for one or more partitions serviced by primary node 110, in one embodiment. Replica node(s) 120a and 120b may begin to copy the reassigned partition(s) 134 to primary node 150 (which may store the reassigned partition(s) 152), in one embodiment. Different techniques for copying partition(s) 134 may be implemented. In one embodiment, replica node(s) 120a and 120b may split the copying work for the partition(s) to send evenly (or near evenly). In one embodiment, replica node(s) 120a and 120b may split the copying work for the partition(s) unevenly. For example, replica node 120 may copy more of the partition(s) as the capacity of replica node 120a to perform the move is greater (e.g. due to different hardware capabilities or workload caused by other components operating at a same host as replica node 120a) than replica node 120b. In one embodiment, partition(s) may be generated or determined as snapshots corresponding to a single point in time for the database. In this way, a consistent version of the partition may be copied to primary node 150.

FIG. 1C illustrates an example embodiment where primary node 110 replicates missing changes 136 to primary node 150. Missing changes may be changes to the partition received at primary node 110 after the point in time corresponding to snapshots used to generate partition(s) 152 at primary node 150. For example, updates to a database may be assigned a sequence number, in one embodiment. The snapshot(s) to create partition(s) 152 may also correspond to a sequence number. For updates that have sequence numbers after (e.g., greater) than the sequence number of the snapshot(s), then primary node 110 may replicate the changes 136 to primary node 150.

FIG. 1D illustrates that request processing mapping 142 may be updated to redirect access requests 170 for the moved partitions to primary node 150, in one embodiment. In a split operation, as depicted in FIGS. 1B-1D, primary node 110 may still retain responsibility for processing access requests to other partitions 114. Replica nodes 120a and 120b may accept replicated changes 162 from primary node 110 for the remaining partitions, in one embodiment.

Please note that previous descriptions of moving database partitions from replica nodes are not intended to be limiting, but are merely provided as logical examples. Different implementations of primary nodes 110 or 150 may be conceived, as can implementations of replica node(s) 120a and 120b. For example, instead of a cluster of multiple replica nodes, a single replica node could be implemented to perform moving database partitions from replica nodes.

This specification begins with a general description of a provider network that may implement a database service that may perform moving database partitions from replica nodes, in one embodiment. Then various examples of a database service are discussed, including different components/modules, or arrangements of components/module, that may be employed as part of implementing the database service, in one embodiment. A number of different methods and techniques to implement moving database partitions from replica nodes are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
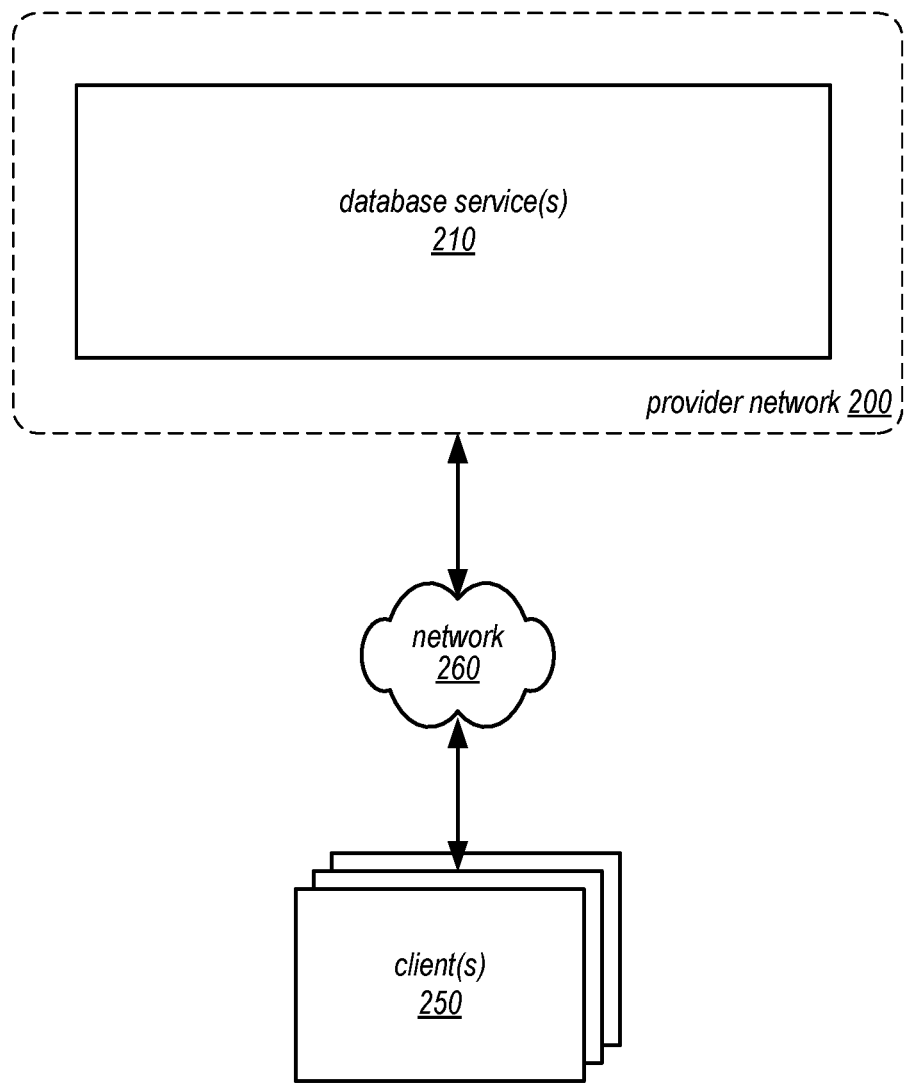
FIG. 2 is a logical block diagram illustrating a provider network that implements a database service, according to some embodiments.

FIG. 2 is a logical block diagram illustrating a provider network that implements a database service, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and storage services offered by the provider network 200. In one embodiment, provider network 200 may implement various computing resources or services, such as database service(s) 210 or other data processing (e.g., relational or non-relational (NoSQL) database query engines, map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 11 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may also be any of various types of data processing services to perform different functions (e.g., query or other processing engines to perform functions such as anomaly detection, machine learning, data lookup, or any other type of data processing operation). For example, in at least one embodiment, database service(s) 210 may include a map reduce service that creates clusters of processing nodes that implement map reduce functionality over data stored in one of data storage services 220. Various other distributed processing architectures and techniques may be implemented by database service(s) 210 (e.g., grid computing, sharding, distributed hashing, etc.) in another embodiment.

In one embodiment, clients 250 may encompass any type of client configurable to submit network-based requests to provider network 200 via network 260, including requests for database service(s) 210 (e.g., to query a database 210) or data storage service(s) (e.g., a request to create, read, write, obtain, or modify data in data storage service(s), etc.). For example, in one embodiment a given client 250 may include a suitable version of a web browser, or may include a plug-in module or other type of code module configured to execute as an extension to or within an execution environment provided by a web browser. Alternatively in a different embodiment, a client 250 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200, in one embodiment. In one embodiment, client 250 may be configured to generate network-based services requests according to a Representational State Transfer (REST)-style network-based services architecture, a document- or message-based network-based services architecture, or another suitable network-based services architecture.

In one embodiment, a client 250 may be configured to provide access to provider network 200 to other applications in a manner that is transparent to those applications. For example, client 250 may be configured to integrate with a database on database service(s) 210. In such an embodiment, applications may not need to be modified to make use of the storage system service model. Instead, the details of interfacing to the database service(s) 210 may be coordinated by client 250.

Clients 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in one embodiment, clients 250 may communicate with provider network 200 using a private network rather than the public Internet.

Figure 3:
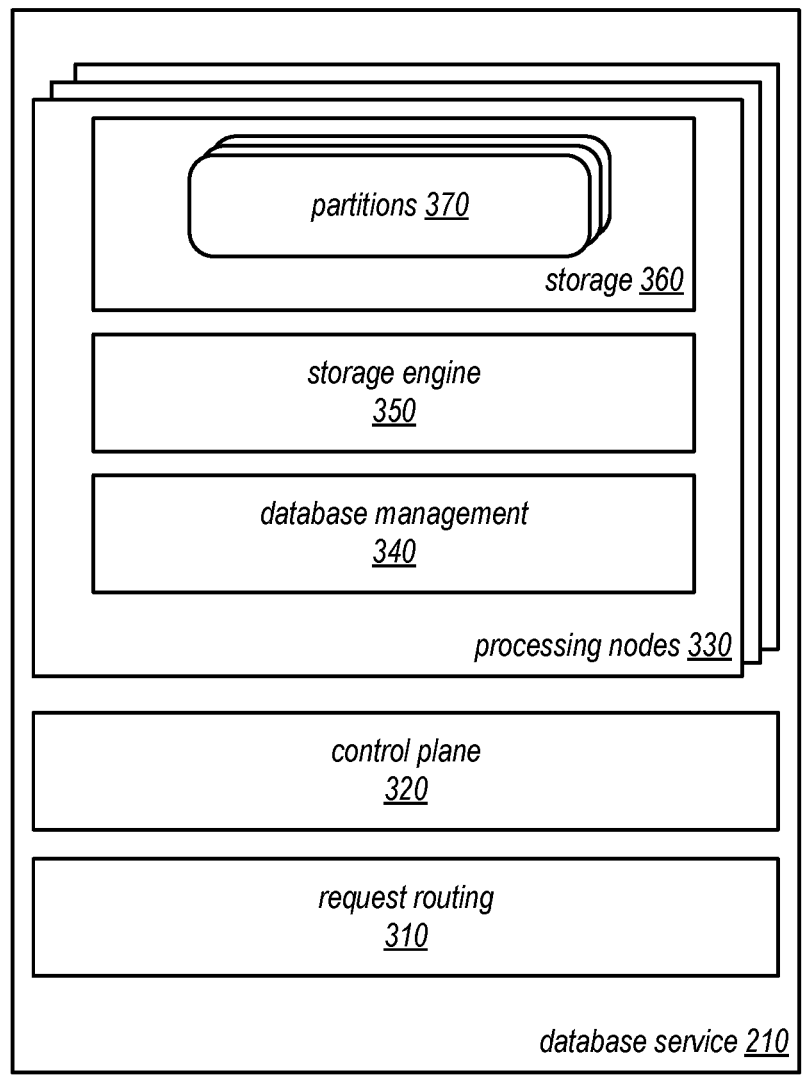
FIG. 3 is a logical block diagram illustrating a database service that may implement moving database partitions from replica nodes, according to some embodiments.

FIG. 3 is a logical block diagram illustrating a database service that may implement moving database partitions from replica nodes, according to some embodiments. Database service 210 may implement request routing 310, in one embodiment. Request routing may be configured to receive, authenticate, parse, throttle and/or dispatch service requests, among other things, in one embodiment. In one embodiment, database service 210 may implement control plane 320 to implement one or more administrative components, such as automated admin instances which may be configured to provide a variety of visibility and/or control functions, as described in more detail herein). In one embodiment, database service 210 may also implement a plurality of processing nodes 330, each of which may manage one or more partitions 370 of a data set (e.g., a database) on behalf of clients/users or on behalf of the data storage service (and its underlying system) which may be stored in internal storage 360 (on storage devices attached to processing nodes 330) or, in another embodiment, one or more partitions 390 in external storage 380 which may be accessed by processing nodes 330 (e.g., via network connections).

Control plane 320 may provide visibility and control to system administrators, detect split events for processing nodes, and/or anomaly control, resource allocation, in one embodiment. In one embodiment, control plane 320 may also include an admin console, through which system administrators may interact with the data storage service (and/or the underlying system). In one embodiment, the admin console may be the primary point of visibility and control for the data storage service (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 320 may provide an interface or access to information stored about one or more detected control plane events, such as split requests to be processed, at storage service 230, in one embodiment.

Control plane 320 may be configured to direct the performance of different types of control plane operations among the nodes, systems, or devices implementing database service 210, in one embodiment. For instance, control plane 320 may be configured to communicate with processing nodes to initiate the performance of various control plane operations, such as moves, splits, update tables, delete tables, create indexes, etc. . . . In one embodiment, control plane 320 may be configured to update a task registry (or some other table or data structure) with the status, state, or performance information of the control plane operations currently being performed. Control plane 320 may detect, direct, or otherwise instigate different partition movement operations, as discussed below with regard to FIGS. 4-10.

In one embodiment, request routing 310 may support handling requests formatted according to an interface to support different types of web services requests. For example, in one embodiments, database service 210 may be configured to implement a particular web services application programming interface (API) that supports a variety of operations on tables (or other data objects) that are maintained and managed on behalf of clients/users by the data storage service system (and/or data stored in those tables). In one embodiment, database service 210 may be configured to support different types of web services requests. For example, in one embodiments, database service 210 may be configured to implement a particular web services application programming interface (API) that supports a variety of operations on tables (or other data objects) that are maintained and managed on behalf of clients/users by the data storage service system (and/or data stored in those tables). In one embodiment, request routing 310 may perform parsing and/or throttling of service requests, authentication and/or metering of service requests, dispatching service requests, and/or maintaining a partition assignments that map processing nodes to partitions.

Processing nodes 330 may implement database management 340, in one embodiment. Database management 340 may create, update, define, query, and/or otherwise administer databases, in one embodiment. For instance, database management 340 may maintain a database according to a database model (e.g., a relational or non-relational database model). In one embodiment, database management 340 may allow a client to manage data definitions (e.g., Data Definition Language (DDL) requests to describe column definitions, requests to add item attributes, etc.). In one embodiment, database management 340 may handle requests to access the data (e.g., to insert, modify, add, or delete data as well as requests to query for data by generating query execution plans to determine which partitions of a database may need to be evaluated or searched in order to service the query). In one embodiment, database management 340 may also perform other management functions, such as enforcing access controls or permissions, concurrency control, or recovery operations. In one embodiment, database management 340 may send requests to storage engine 350 to access partitions 370 in order to process access requests (e.g., requests to read or scan different partitions or particular items or parts of data within a partition).

In one embodiment, processing nodes 330 may implement storage engine 350 to access either internal storage and/or external storage 360. Storage engine 350 may perform requests on behalf of database management to create, read, update and delete (CRUD) data in a partition, in one embodiment. Storage engine 350 may implement buffers, caches, or other storage components to reduce the number of times storage is accessed, in one embodiment. Storage engine 350 may implement various storage interfaces to access storage 360. For example, in those embodiments where external storage is a network-based data storage service, like another data storage service in provider network 200 in FIG. 2, then storage engine 350 may be configured to establish a network connection with the service as part of obtaining access to a storage unit (e.g., by submit requests formatted according to a protocol or API to establish the connection). In another embodiment, storage engine 350 may access internal storage using storage protocols (e.g., Small Computer Systems Interface (SCSI)) over a bus or other interconnect that directly connects a host implementing storage engine 350 with internal storage 360).

In one embodiment, database service 210 may provide functionality for creating, accessing, and/or managing tables processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 3. Note also that in one embodiment, one or more processing nodes 330 process access requests on behalf of clients directed to tables. Some of these processing nodes may operate as if they were in a multi-tenant environment, and others may operate as if they were in a single-tenant environment. In one embodiments, processing nodes 330 that operate as in a multi-tenant environment may be implemented on different processing nodes (or on different virtual machines executing on a single host) than processing nodes that operate as in a single-tenant environment.

Figure 4A:
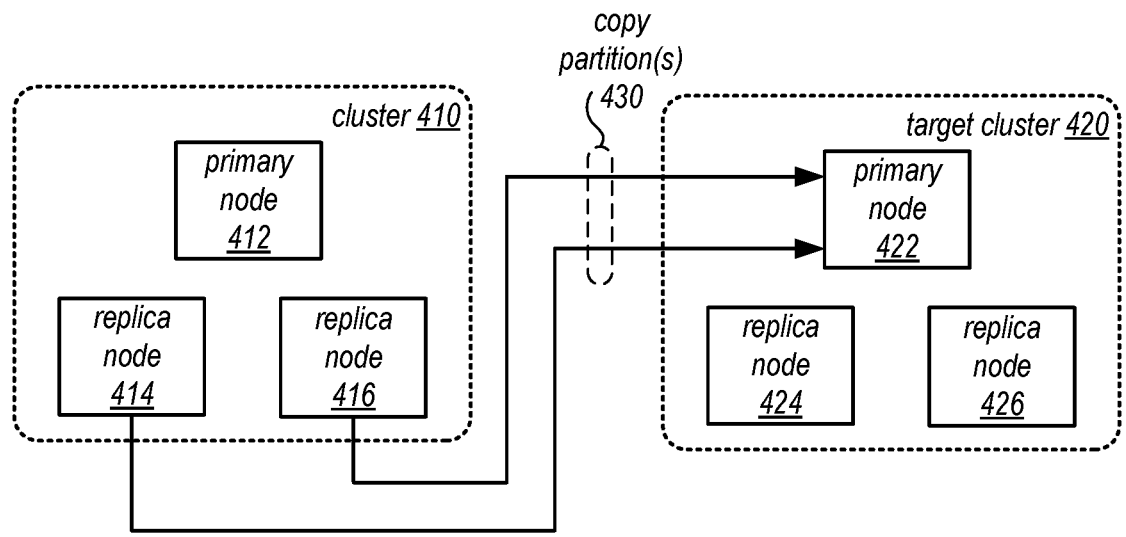
FIGS. 4A-4C are logical block diagrams for moving database partitions from replica nodes to merge partitions assigned to a primary node, according to some embodiments.
Figure 4B:
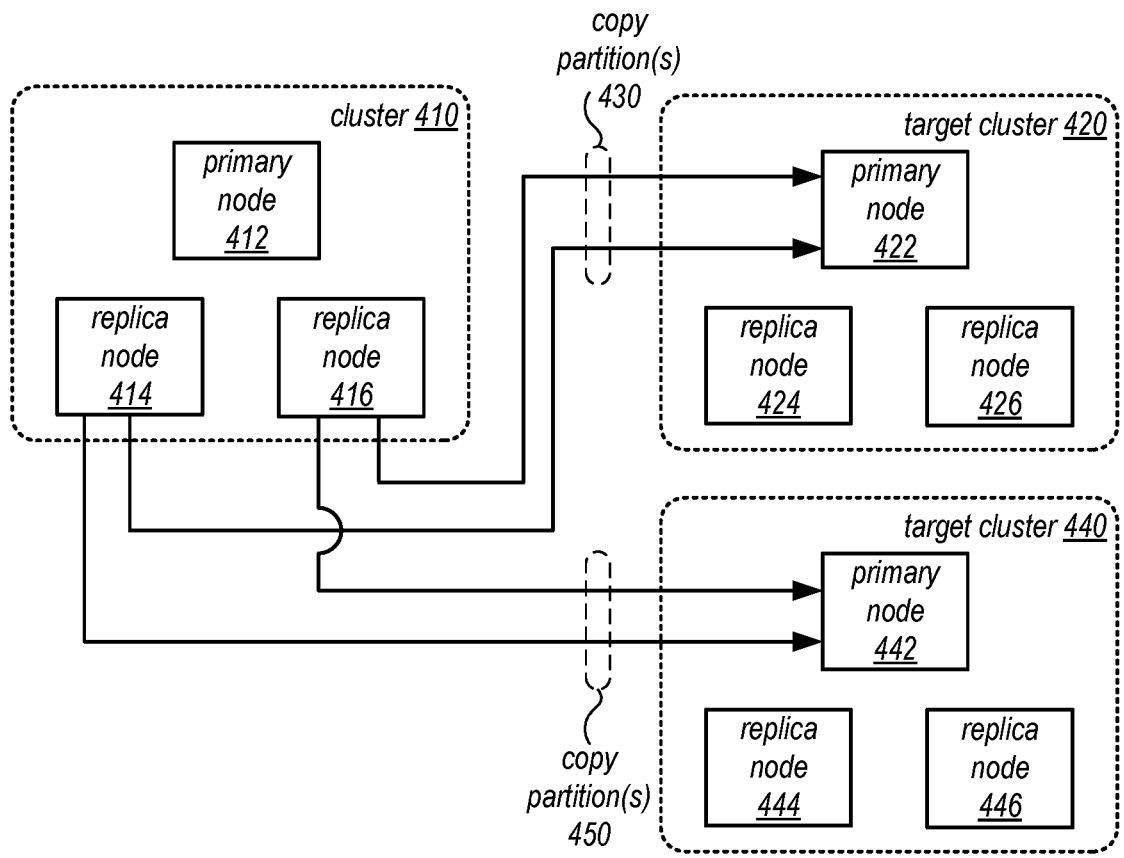
Figure 4C:
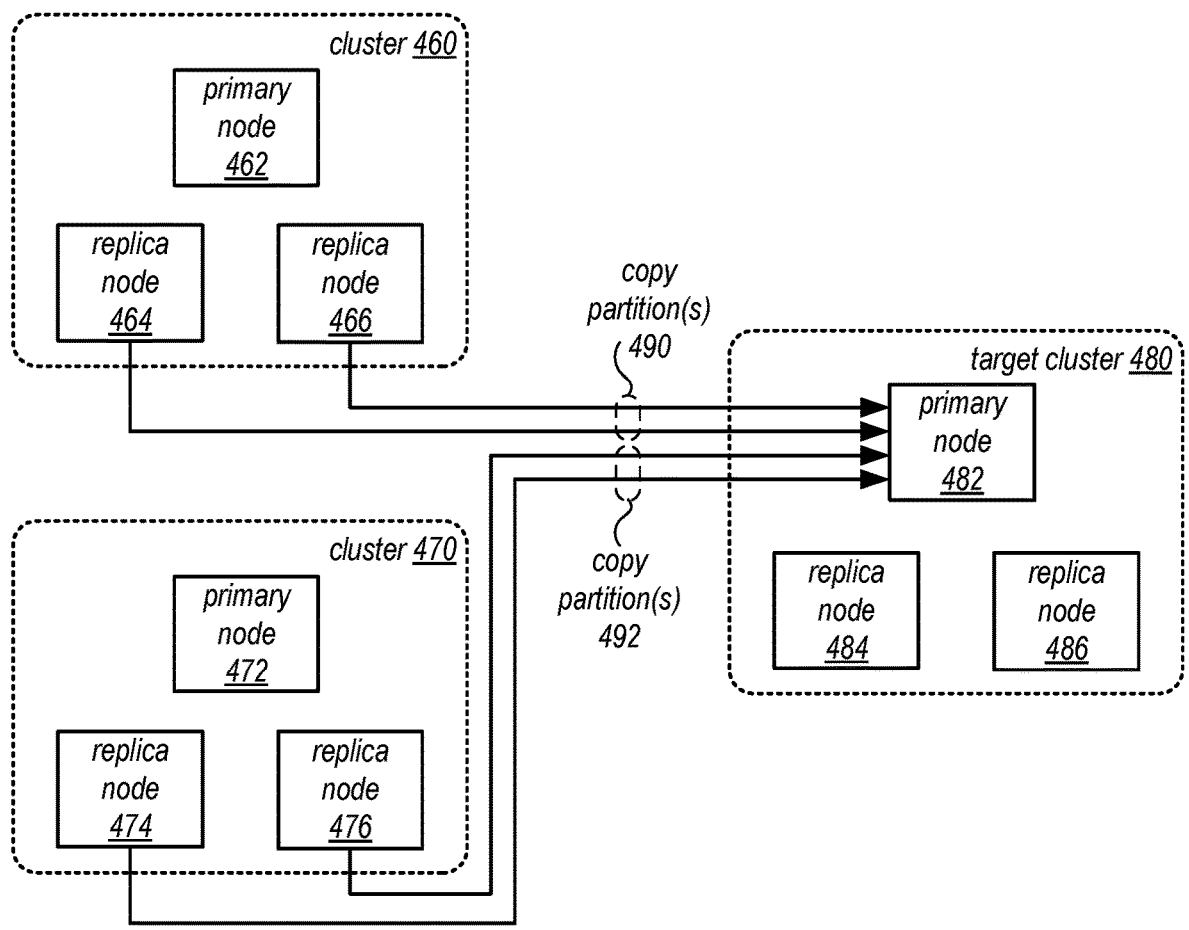

FIG. 4A is a logical block diagram illustrating movement of a database partitions from replica nodes to merge partitions assigned to a primary node, according to some embodiments. For example, cluster 410 may include primary node 412 and replica nodes 414 and 416 to process and maintain one or more partitions of a database and target cluster 420 may include primary node 422 and replica nodes 424 and 426 to process and maintain one or more other partitions of the database. Over time, utilization of both cluster 410 and target cluster 420 may become unnecessary to maintain a performance standard for processing access requests to the database. For example, the I/O utilization of both cluster 410 and target cluster 420 may be less than the reserved or available capacity at either cluster to handle access requests for the database. A data movement operation may detected or determined by a control plane, such as control plane 310, in FIG. 3, to merge the partitions from cluster 410 onto target cluster 420 (reducing the number of clusters providing access to the database to one cluster, in one embodiment. As discussed above, with regard to FIG. 1, and below with regard to FIGS. 5-10, replica nodes 414 and 415 may copy 430 the partition(s) of the database to move from cluster 410 to primary node 422 (allowing for distributed transfer of the partition(s) to target cluster 420), in one embodiment.

Merge operations, however, can move partitions to different clusters. For example, in FIG. 4B, a similar scenario may occur, where the combined processing capability of cluster 410, target cluster 420, and target cluster 440 (which includes primary node 442 and replica nodes 444 and 446), exceeds the requirements of clients for the database. Instead of moving one or multiple partitions to a single cluster, different partition(s) may be generated and/or moved from cluster 410 to target clusters 420 and 440 (e.g., by copying the partitions to each target cluster respectively, as indicated at 430 and 450). In this way, data partition movement operations can be finely tuned to meet the performance requirements of a database (e.g., by splitting and/or merging partitions at target clusters), in one embodiment. Similarly, in FIG. 4C, multiple source clusters may merge partitions at single target cluster, in one embodiment. For example, to reduce the number of clusters processing access requests for a database, all of the partitions from clusters 460 and 470 may be moved to cluster 470. The replica nodes of the source clusters, replica nodes 464, 466, 474, and 476, may copy, 490 and 492, the respective partitions to the primary node 482 of target cluster 480, in one embodiment. Target cluster 480 may eventually copy the partitions to its own replica nodes, 484 and 486, in one embodiment. Although not illustrated, primary nodes 462 and 472 may replicate changes that occurred to the moved partitions while the partitions are being copied, as discussed above.

Figure 5:
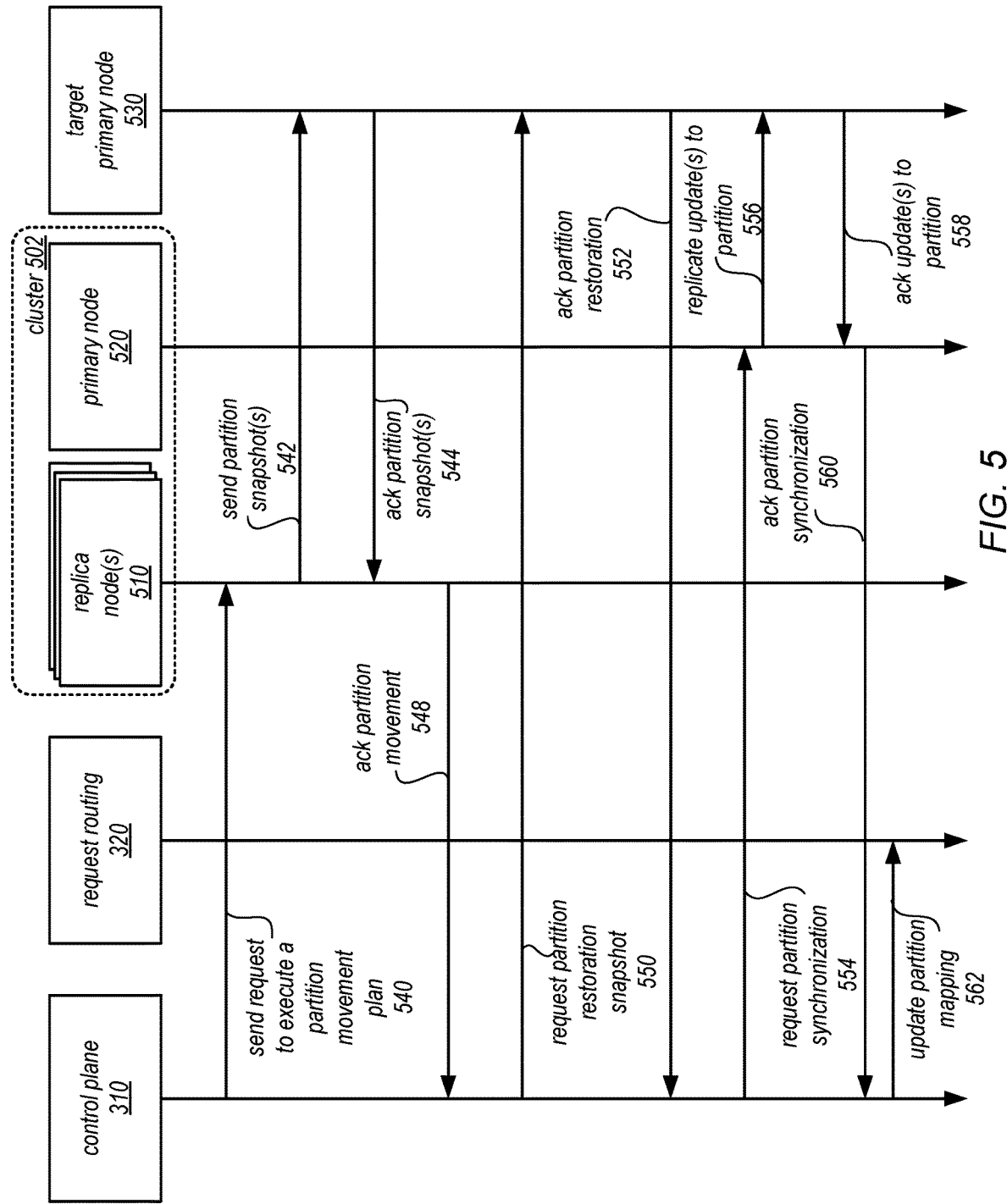
FIG. 5 is an example sequence diagram for moving a database partition from a replica node, according to some embodiments.

FIG. 5 is an example sequence diagram for moving a database partition from a replica node, according to some embodiments. Control plane 310 may detect a data movement event, in one embodiment. For example, control plane 310 may determine that primary node 520 is "hot" (e.g., exceeding a utilization threshold for number of access requests, I/O bandwidth, processing bandwidth, etc.) and determine that a movement operation to split processing responsibility away from primary node 520 may alleviate the stress imposed on primary node 520, in one embodiment. Control plane 310 may determine a partition movement plan and send a request to execute the partition movement plan to replica node(s) 510 of the same cluster 502 as primary node 520 (and thus replicate the data that is managed by primary node 520), as discussed below with regard to FIGS. 8 and 9. Replica node(s) 510 may then generate and send partition snapshot(s) 542 according to the partition movement plan 542, to the target primary node 530. For example, replica node(s) 510 may generate different sizes or portions of the data within the partition as the partition snapshots and send them to target primary node(s) 530, in one embodiment. Various other examples are discussed below with regard to FIGS. 7-9. Target primary node 530 may acknowledge the partition snapshot(s) 544, so that replica node(s) 510 can acknowledge the partition movement to control plane 310, in one embodiment.

Control plane 310 may send a request 550 to perform a restoration identifying the snapshot as the view of the database at which target primary node 530 is to restore. For example, a restoration operation may, in one embodiment, combine multiple received partitions, check for duplicates or other errors and perform corrections, if found, in one embodiment. Target primary node 530 may load or obtain the management data structures (e.g., data dictionaries, transaction tables, etc.) consistent with the partition snapshot into memory or other accessible storage in order to allow target primary node 530 to operate upon the partition of the database consistent with the restored partition, in one embodiment. Target primary node 530 may acknowledge the partition restoration 552 to control plane 310, in one embodiment.

Control plane 310 may request partition synchronization 554 from primary node 520, in one embodiment. Primary node 520 may send updates that have occurred (and been committed) to data within the partition after the period of time corresponding to the snapshot of the partition (as discussed below with regard to FIG. 10), in one embodiment. Replication of updates to the partition 556 may be sent as logical descriptions of changes to be performed, in one embodiment, or data blocks, pages, chunks, or other data objects to replace the corresponding blocks, pages, chunks or other data objects that have been updated, in one embodiment. Target primary node 530 may send acknowledgments of update(s) 558 to primary node 520. Primary node 520 may acknowledge the synchronization to control plane 310, indicating that target primary node is ready to begin accepting requests for the partition, in one embodiment. In one embodiment, control plane 310 may update partition mapping 562 in request routing layer 320 in order to direct requests for the partition to target primary node 530 instead of primary node 520. Although the example embodiments discussed above with regard to FIG. 5 have illustrated various features of a push-based communication model, similar techniques could be applied in embodiments that implement a pull-based model.

Figure 6:
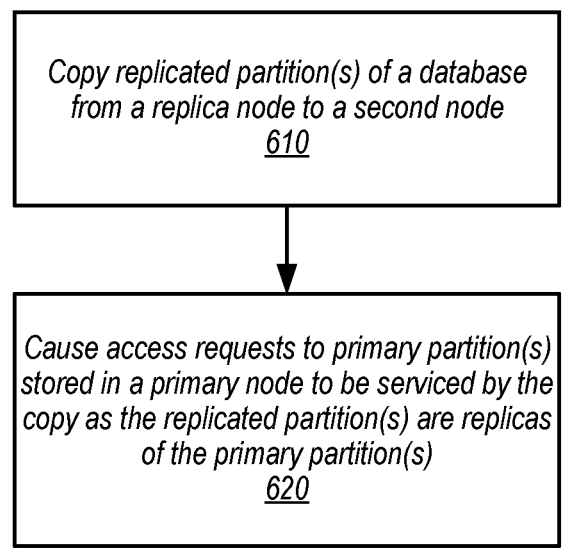
FIG. 6 is a high-level flowchart illustrating various methods and techniques to move database partitions from replica nodes, according to some embodiments.

The examples of moving database partitions from replica nodes as in FIGS. 2-5 have been given in regard to a database service (e.g., a non-relational or NoSQL database service or a relational database service). However, various other types of database systems or data processing systems may implement moving database partitions from replica nodes, in other embodiments. FIG. 6 is a high-level flowchart illustrating various methods and techniques to move database partitions from replica nodes, according to some embodiments. These techniques, as well as the techniques discussed with regard to FIGS. 7-10, may be implemented using components or systems as described above with regard to FIGS. 2-5, as well as other types of databases, storage engines, systems, or clients and thus the following discussion is not intended to be limiting as to the other types of systems that may implement the described techniques.

As indicated at 610, replicated partition(s) of a database may be copied from a replica node to a second node, in one embodiment. For example, a database may be previously partitioned at a replica node of a primary node that services access requests to those partitions hosted at the primary node and replicated at the replica node. In one embodiment, multiple replica nodes may copy the data to the second node. The replica nodes may first generate and/or determine the replicated partition(s), as discussed below with regard to FIG. 7.

As indicated at 620, access requests to primary partition(s) stored in a primary node to be serviced by the copy, as the replicated partitions are replicas of the primary partition(s), in one embodiment. For example, an assignment mapping or other metadata indicating the routing of requests to nodes may be changed to identify the second node as mapped to the primary partition(s) instead of the primary node, in one embodiment. The second node may access and treat the replicated partitions as if they were the primary partition(s) (e.g., the authoritative copies of the partition of the database). Assignment information may be hosted and enforced in a separate routing layer or system, or by hosts, instances, or platforms executing the first storage engine and other storage engines, such as the second storage engine, in one embodiment.

Figure 7:
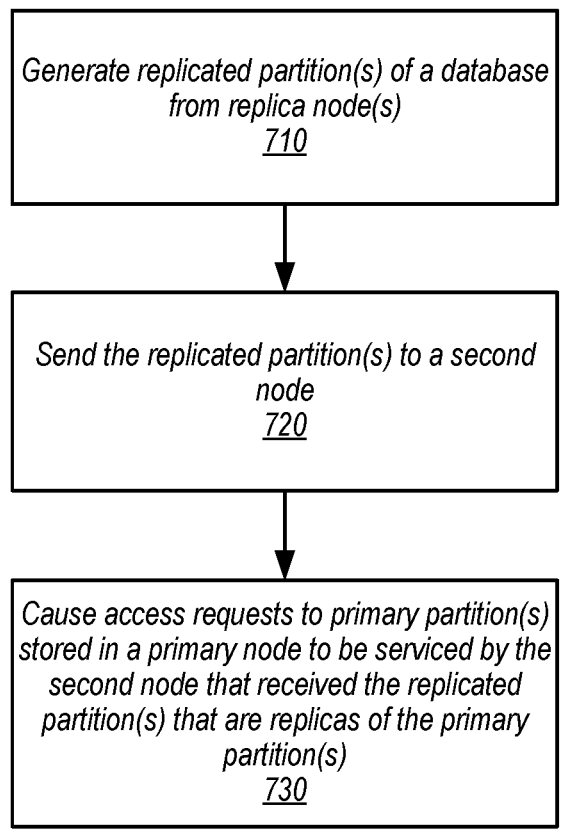
FIG. 7 is a high-level flowchart illustrating various methods and techniques to generate and move database partitions from replica nodes, according to some embodiments.

FIG. 7 is a high-level flowchart illustrating various methods and techniques to generate and move database partitions from replica nodes, according to some embodiments. As indicated at 710, replicated partition(s) of a database may be generated from replica node(s), in one embodiment. For example, the replica node(s) may read the replicated copy of a primary node's data in storage at the replica node, one embodiment. As the data for a partition may be comingled in storage with other data in the database not in the partition (e.g., in other partitions), the replicated storage node(s) may separate out or otherwise gather the data for the partition. For example, if the partition is identified as all data records in a single table, then the storage may be read to filter out every data record in storage at the replicated partition but those data records in the table, in one embodiment. Other partition schemes, such as partition schemes by data value (e.g., partition key, identifier, or attribute), or partition schemes that divide tables, or other portions of the database according to metadata for the table (or portion thereof), such as time created or stored, may be implemented, in one embodiment. The replicated partition(s) may be collected in a single data object or artifact, in embodiment, or as part of multiple data objects, in another embodiment. In at least some embodiments, the replicated partition(s) may be generated from one or multiple snapshots of the partition(s), corresponding to a single point in time, as discussed in detail below with regard to FIGS. 8 and 10, in one embodiment.

As indicated at 720, the replicated partition(s) may be sent to a second node, in an embodiment. The second node may be another primary node identified for handling access requests to the partition of the database, as discussed below with regard to FIG. 9. The second node may be identified according to a network address or resource identifier in order to direct the replicated partitions to the second node, in one embodiment. The second node may receive, store, and/or further process the replicated partition(s), in one embodiment, in order to provide access to the replicated partition(s). For example, snapshot(s) may be combined, duplicate data detected, and errors corrected, in one embodiment, at the second node.

As indicated at 730, access requests to the primary partition(s) stored in a primary node may be caused to be serviced by the second node that received the replicated partitions that are replicas of the primary partition(s), in one embodiment. For example, an assignment mapping or other metadata indicating the routing of requests to nodes may be changed to identify the second node as mapped to the primary partition(s) instead of the primary node, in one embodiment. The second node may access and treat the replicated partitions as if they were the primary partition(s) (e.g., the authoritative copies of the partition of the database). Assignment information may be hosted and enforced in a separate routing layer or system, or by hosts, instances, or platforms executing the first storage engine and other storage engines, such as the second storage engine, in one embodiment.

Figure 8:
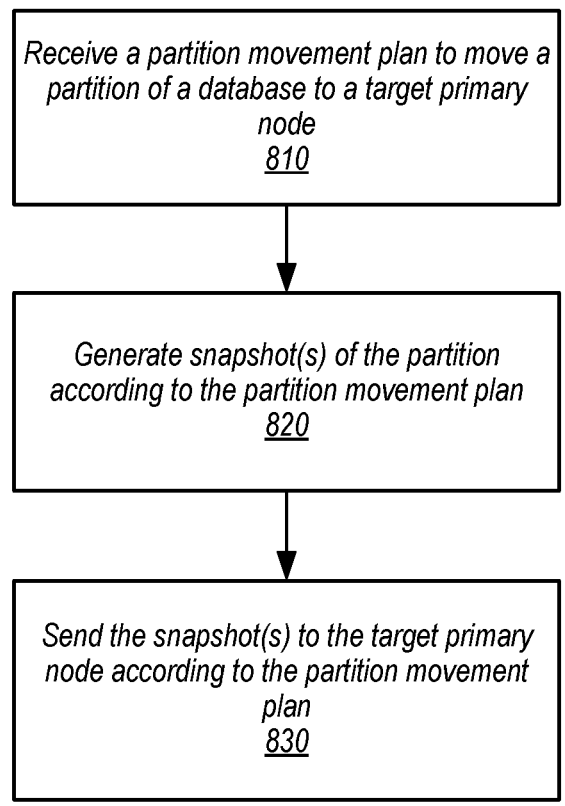
FIG. 8 is a high-level flowchart illustrating various methods and techniques to execute a partition movement plan, according to some embodiments.

FIG. 8 is a high-level flowchart illustrating various methods and techniques to execute a partition movement plan, according to some embodiments. As indicate at 810, a partition movement plan to move a partition of a database to a target primary node may be received, in one embodiment. For example, a request formatted according to an API or other interface implemented at replica nodes may provide an interface to obtain, parse, and execute the partition movement plan indicated in the request.

As indicated at 820, snapshot(s) of the partition may be generated according to the partition movement plan, in one embodiment. A snapshot of a partition may be generated to provide a view of the data in the partition that is consistent with a single point in time. For example, if the point in time is indicated or identified by a timestamp, then the partition of the database may be a consistent state of all of the data included within the partition as of the timestamp, in one embodiment. In such an example, changes to data in the partition that corresponding to a point in time after the point in time of the partition may be ignored or excluded when generating the snapshot. Changes that are earlier or otherwise within the time frame corresponding to the point in time for the partition may be included or applied as part of generating snapshot(s).

One or multiple snapshot(s) may be generated at multiple replica node(s), in one embodiment. In one embodiment, a single replica node may generate one or multiple snapshot(s). The snapshot(s) may be generated according to the data partition plan, in one embodiment. For instance, the data partition plan may identify what portion of the partition to include in a snapshot, in one embodiment. For example, if the partition to move includes data within database that has partition keys of 10,001 to 10,100, then the partition plan may assign the generation of a snapshot that includes partition key(s) 10,00 to 10,050 to one replica node, partition keys 10,051 to 10,075, to another node, and partition keys 10,076 to 10,100 to a third node.

The partition movement plan may identify the target primary node (e.g., by a network address or resource identifier), in one embodiment. The generated snapshot(s) may be sent to the target primary node according to the partition movement plan, as indicated at 830, in one embodiment. For example, different ways of distributing the work of moving the partition may be implemented, such as staggering the generation of multiple snapshots at a replica node (e.g., in order to prevent the node from being overburdened) in one embodiment, excluding one or more replica nodes in a processing cluster from moving the partition in one embodiment, or setting execution criteria at multiple replica nodes (e.g., to limit the work of moving the partition on a group of replica nodes) in one embodiment.

Figure 9:
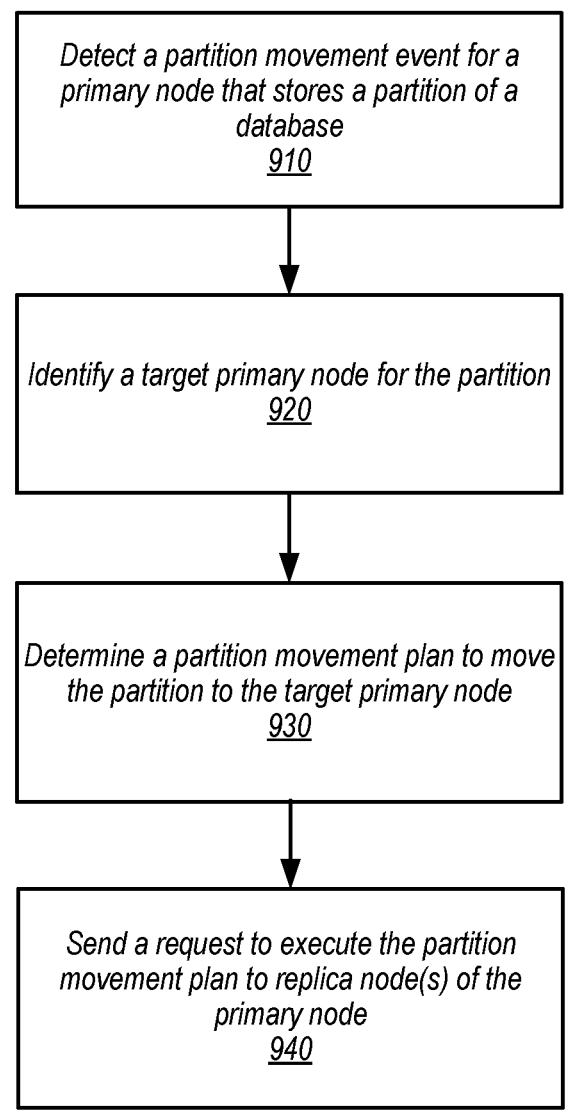
FIG. 9 is a high-level flowchart illustrating various methods and techniques to handle a partition movement event for a primary node servicing access requests for a database, according to some embodiments.

FIG. 9 is a high-level flowchart illustrating various methods and techniques to handle a partition movement event for a primary node servicing access requests for a database, according to some embodiments. As indicated at 910, a partition movement event may be detected for a primary node that stores a partition of a database, in one embodiment. For example, a partition movement event may be triggered in order to split processing responsibility from one node across one or more additional nodes, in one embodiment. A partition movement event may be triggered in order to merge processing responsibility, from one or multiple nodes to another node, in an embodiment. A partition movement event may be triggered in order to execute system or service control plane operations (e.g., to load balance or distribute processing operations amongst a fleet of resources implementing the system or service).

A partition movement event may be detected in several ways. For example, in one embodiment, detecting a partition movement event may include monitoring or evaluating one or multiple movement criteria (e.g., defined by maximum or minimum threshold values for a node, partition, database, traffic count, free space ratio, or other performance criteria) that may indicate that a node is overburdened or underutilized. Partition movement events may also be manually requested (e.g., by a client via an API command or an administrator via an admin API command), in one embodiment. In one embodiment, clients may specify split event criteria when provisioning the storage engine or creating the data set. Partition movement events may be detected or triggered as a result of control plane resource management operations (e.g., redistributing partitions to avoid data centers or other infrastructure with network difficulties or redistributing partitions to utilize new hosts added to a system or service).

As indicated at 920, a target primary node for the partition may be identified, in an embodiment. For example, an assignment map may be evaluated to determine whether a currently operating node is underutilized, in one embodiment. If an underutilized node is found, then the underutilized node may be identified as a target primary node. In one embodiment, a listing of new or newly available hosts for primary target nodes may be searched to identify a target primary node. Other considerations or criteria may also be used to select a target primary node. For example, the network location of the host for the primary target node (e.g., server, server rack, data center, geographic region) may be evaluated to identify an available primary node that is closer to the replica nodes moving the partition. In one embodiment, a new primary node may be provisioned (e.g., booted) to serve as the target primary node (e.g., by sending a request to virtual compute service or other hosted resource provider).

As indicated at 930, a partition movement plan may be determined to move the partition to the target primary node, in an embodiment. A partition movement plan may identify replica node(s) to perform the generation, sending, or copying of partition (e.g., according to the techniques discussed above with regard to FIGS. 6-8) and how the identified replica node(s) are to perform the generation, sending, or copying of the partition (e.g., what partition data to send from each replica node and how to send the replicated data). For example, in one embodiment, the partition movement plan may assign different subsets or portions of the partition to different replica nodes. In this way, the movement of the partition can be performed in parallelized fashion. Assignment of different subsets or portions may be uneven, in one embodiment. In this way, the partition movement plan can account for the different load that may be present on the different replica nodes (e.g., in multi-tenant systems where a host system hosts multiple nodes for different databases so that the same replica nodes may have different workloads due to different other nodes hosted at the same host). The partition movement plan may indicate or direct the movement of partition data according to a schedule, sequence or ordering, and may specify specific times or conditions in which the partition data may be moved. For example, the partition movement plan may specify different times in which different replica nodes move the assigned portion of the partition to the target primary node, in one embodiment. In one embodiment, the partition movement plan may specify conditions such as utilization thresholds which if not exceeded may indicate that movement of the partition can be performed at a relocated node (e.g., move partition data when processor or I/O utilization is less than 60% capacity).

As indicated at 940, a request may be sent to execute the partition movement plan to the replica node(s) of the primary node. For example, a request formatted according to an API or other interface implemented at replica nodes may obtain, parse, and execute the partition movement plan indicated in the request.

Figure 10:
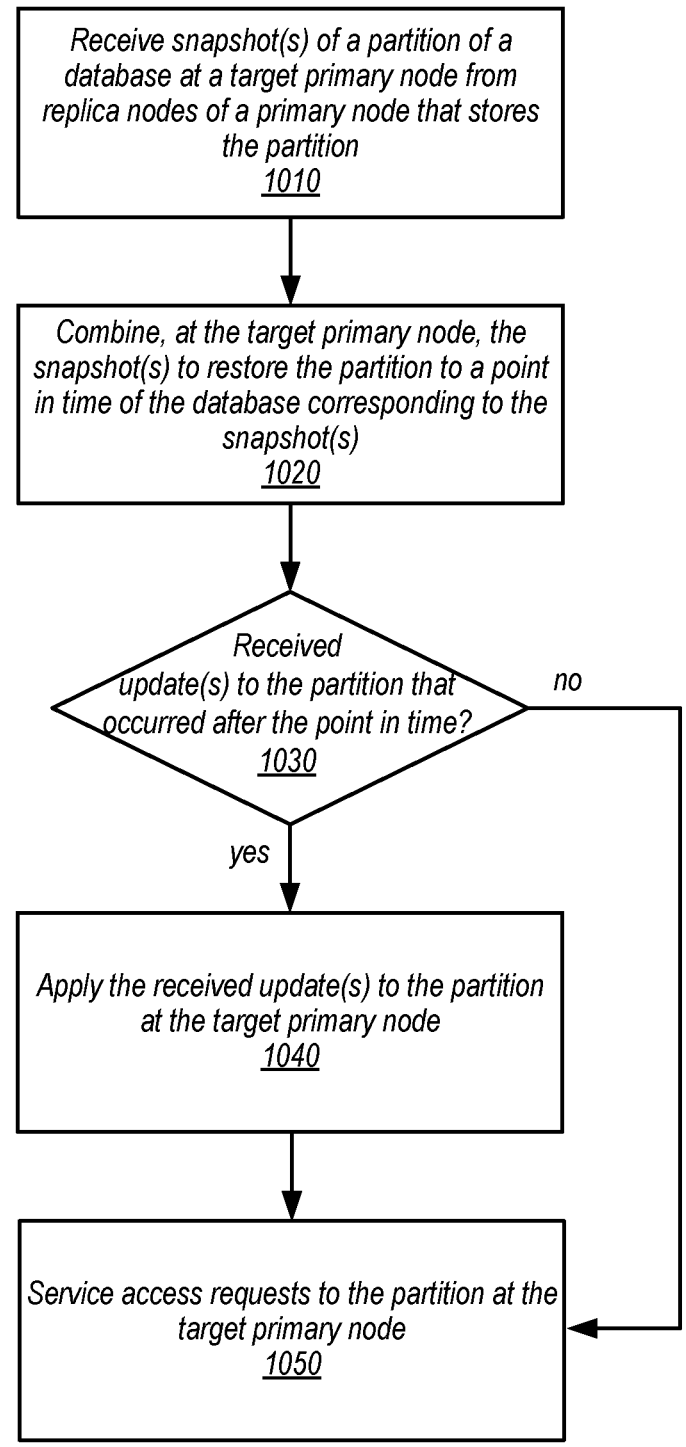
FIG. 10 is a high-level flowchart illustrating various methods and techniques to create a partition at a target primary node for servicing access requests, according to some embodiments.

FIG. 10 is a high-level flowchart illustrating various methods and techniques to create a partition at a target primary node for servicing access requests, according to some embodiments. As indicated at 1010, snapshot(s) of a partition of a database may be received at a target primary node from replica nodes of a primary node that stores the partition. As discussed above with regard to FIG. 8, different snapshot(s) that make up a partition of a database can be generated in different embodiment. In one embodiment, for example, the different snapshots may include items of the database (e.g., different rows or object) with a partition key, identifier or other attribute that is included in a subset of partition keys copied from an assigned replica node. Thus, in such an example, one snapshot received from one replica node may include data with partition keys "AA" to "GZ" and a snapshot received from another replica node that may include data with partition keys "HA" to "KZ." Both snapshots may together make up the partition to be moved to the target primary node, a partition that includes data with partition keys form "AA" to "KZ." In one embodiment, partition snapshots may be approximately or nearly the same size (or number of items). Partition snapshot(s) may be different sizes, in one embodiment. Partition snapshot(s) may be received over a broad range of time (e.g., several minutes apart but still received within a partition movement operation window) or at the same (or near the same time), in an embodiment.

The snapshot(s) may be combined at the target primary node, as indicated at 1020, in order to restore the partition to a point in time of the database corresponding to the snapshot(s), in one embodiment. For example, the different snapshot(s) may include all of the data that makes up the partition to be moved, but may not be packaged, stored, or otherwise sent in the snapshot(s) in the order or format in which a partition of the database is stored for servicing access requests. In one embodiment, a reformat operation may combine, sort, rearrange, or rewrite the data from the received snapshot(s) in storage accessible to the target primary node that is in the format for servicing access requests. In some embodiments, a restore operation, or other task or process for reconciling snapshots, may be requested at the primary target node, which checks the snapshot(s) for errors, duplicate data values (e.g., duplicate entries) or other data problems (e.g., corrupt data). In such embodiments, corrections or requests for additional data may be made in order to cure the identified errors, duplicates or other data problems. Once combined, the partition may provide a view of the partition of the database at the point in time corresponding to when the partition was created or requested, in an embodiment. For instance, a logical time or ordering (e.g., sequence numbers) may be assigned to changes to the partition of the database so that the snapshot may be associated with a sequence number, including all changes to the partition of the database made up to the point in time.

In some embodiments, update(s) may be made to the primary partition at the primary node that is the source of the moved partition. As indicated at 1030, update(s) to the partition may be received that occurred after the point in time corresponding to the snapshot(s), in an embodiment. For instance, update(s) assigned logical sequence numbers with values that occur after the point in time (e.g., higher sequence number values than the sequence value number for the snapshot(s)), may be sent to the target primary node from the primary node that is the source of the partition. In this way, access to the database may continue at the primary node while the target primary node is being prepared to assume processing responsibilities for the moved partition.

As indicated by the positive exit from 1030, if update(s) from the primary node are received that occurred after the point in time, then the received update(s) to the partition at the target primary node may be applied, in one embodiment. Different types of update(s) may be received. In one embodiment, update(s) may be logical or describe so that the target primary node may replay or other perform the update as if it had received the update directly from a client of the database. In one embodiment, update(s) may be copies of data blocks, pages, chunks, or other portions of the partition that include applied update(s), so that performing a storage operation can apply the update(s) (e.g., by overwriting the data blocks, pages, chunks, or other portions of the partition that include the applied update(s) in storage at the target primary node).

As indicated at 1050, access requests to the partition may be serviced at the target primary node. For example, once the partition is restored or synchronized, then the target primary node may begin accepting access requests and processing them by accessing the partition.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 11:
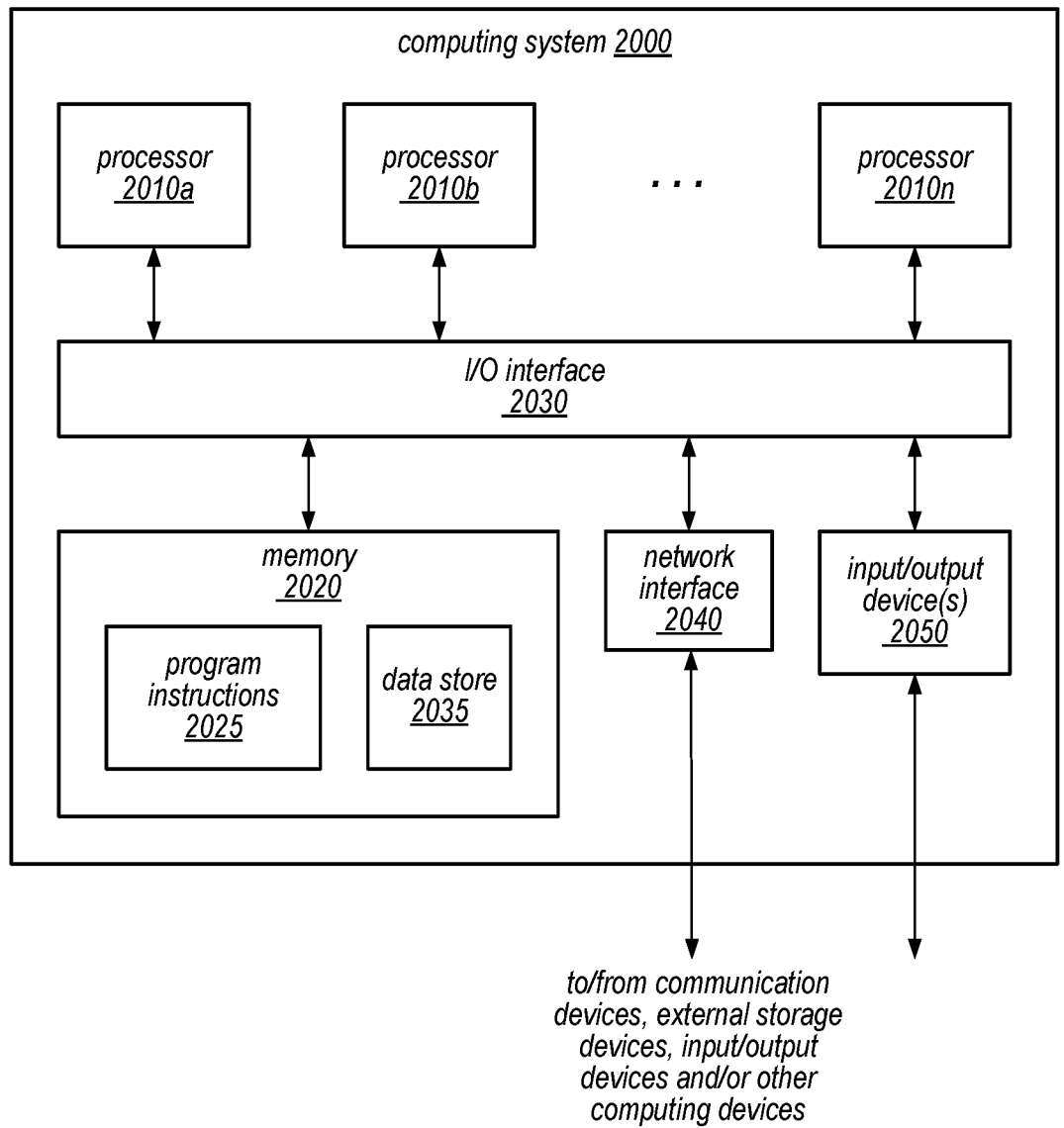
FIG. 11 is a block diagram illustrating an example computing system, according to some embodiments.

Embodiments of moving database partitions from replica nodes as described herein may be executed on one or more computer systems, which may interact with various other devices. One such computer system is illustrated by FIG. 11. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions, in one embodiment. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s), in one embodiment.

System memory 2020 may be configured to store program instructions 2025 and/or data accessible by processor 2010, in one embodiment. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. A computer-accessible medium may include non-transitory storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040, in one embodiment.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000, in one embodiment. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000, in one embodiment. Multiple input/output devices 2050 may be present in computer system 2000 or may be distributed on various nodes of computer system 2000, in one embodiment. In some embodiments, similar input/output devices may be separate from computer system 2000 and may interact with one or more nodes of computer system 2000 through a wired or wireless connection, such as over network interface 2040.

As shown in FIG. 11, memory 2020 may include program instructions 2025, configured to implement the various embodiments of the systems as described herein, and data store 2035, comprising various data accessible by program instructions 2025, in one embodiment. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 2000 may be transmitted to computer system 2000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a memory to store program instructions which, when performed by at least one processor, cause the at least one processor to perform a method to at least:
   copy a replicated partition of a database from one or more replica nodes to a second primary node, wherein the replicated partition is a replica of one of a plurality of different partitions of the database stored at a first primary node; and
   direct access requests for the one partition to the replicated partitions at the second primary node, wherein access requests to other ones of the plurality of different partitions of the database are serviced by the first primary node.

2. The system of claim 1, wherein to copy the replicated partition, the program instructions cause the at least one processor to generate a snapshot of the replicated partition corresponding to a point in time for the replicated partition.

3. The system of claim 2, wherein the program instructions further cause the at least one processor to perform the method to further apply, at the second primary node, one or more updates describing respective changes to the replicated partition that occurred after the point in time, wherein the one or more updates are received from the first primary node.

4. The system of claim 1, wherein the at least one processor and the memory are implemented as part of a network-based database service that hosts the database on behalf of one or more clients of the database service.

5. A method, comprising:
   generating a replicated partition of a database from one or more replica nodes, wherein the replicated partition is a replica of one of a plurality of different partitions of the database stored at a first primary node;
   sending the replicated partition to a second primary node; and
   directing access requests for the one partition to the replicated partition at the second primary node, wherein access requests to other ones of the plurality of different partitions of the database are serviced by the first primary node.

6. The method of claim 5, wherein generating the copies of the one or more replicated partitions of the database from one or more replica nodes comprises splitting a larger replicated partition that includes the one or more replicated partitions.

7. The method of claim 5, wherein generating the one or more replicated partitions of the database from one or more replica nodes comprises generating different size portions of the one or more replicated partitions from different ones of the replica nodes.

8. The method of claim 5, wherein sending the one or more replicated partitions to the second primary node comprises sending from different ones of the replica nodes according to a schedule, wherein at least one of the replicated partitions is sent at a different time according to the schedule than another one of the replicated partitions.

9. The method of claim 5, wherein generating the one or more replicated partitions of the database from one or more replica nodes comprises generating one or more snapshots of the replicated partitions corresponding to a point in time for the replicated partitions.

10. The method of claim 9, further comprising:
    prior to the causing the access requests to the one or more partitions stored in the first primary node to be serviced by the replicated partitions at the second primary node, combining the snapshots received from different ones of the replica nodes to restore the replicated partitions to the point in time for the replicated partitions.

11. The method of claim 10, further comprising:
    receiving, at the second primary node, one or more updates to the replicated partitions that occurred after the point in time; and
    applying, at the second primary node, the one or more updates to the replicated partitions.

12. The method of claim 5, further comprising:
    detecting, at a control plane for the database, a partition movement event for the first primary node;
    identifying the second primary node as a target primary node;
    determining a partition movement plan to move the replicated partitions to the target primary node; and
    sending a request to the replica nodes to execute the partition movement plan, wherein the generating the replicated partitions and the sending the replicated partitions are performed by the replica nodes according to the partition movement plan.

13. The method of claim 12, wherein the first primary node, the second primary node, the replica nodes, and the control plane for the database are implemented as part of a network-based database service that hosts the database on behalf of one or more clients of the network-based database service.

14. A non-transitory, computer-readable storage medium, storing program instructions that when executed by one or more computing devices cause the one or more computing devices to implement:
    copying a replicated partition of a database from one or more replica nodes to a second primary node, wherein the replicated partition is a replica of one of a plurality of different partitions of the database stored at a first primary node; and
    directing access requests for the one partition to the replicated partition at the second primary node, wherein access requests to other ones of the plurality of different partitions of the database are serviced by the first primary node.

15. The non-transitory, computer-readable storage medium of claim 14, wherein to copy the one or more replicated partitions, the program instructions cause the one or more computing devices to generate a snapshot of the one or more replicated partitions corresponding to a point in time for the one or more replicated partitions.

16. The non-transitory, computer-readable storage medium of claim 14, wherein, in copying the replicated partitions of the database from the replica nodes to the second primary node, the program instructions cause the one or more computing devices to implement copying different size portions of the replicated partitions from different ones of the replica nodes.

17. The non-transitory, computer-readable storage medium of claim 14, wherein, in copying the replicated partitions of the database from the replica nodes to the second primary node, the program instructions cause the one or more computing devices to implement generating one or more snapshots of the replicated partitions corresponding to a point in time for the replicated partitions.

18. The non-transitory, computer-readable storage medium of claim 17, wherein the program instructions cause the one or more computing devices to further implement:
    receiving, at the second primary node, one or more updates to the replicated partitions that occurred after the point in time; and applying, at the second primary node, the one or more updates to the replicated partitions.

19. The non-transitory, computer-readable storage medium of claim 14, wherein the program instructions further cause the one or more computing devices to implement:
  receiving, at the replica nodes, a partition movement plan to move the replicated partitions to the second primary node; and
  performing the copying of the replicated partitions according to the partition movement plan.

20. The non-transitory, computer-readable storage medium of claim 14, wherein the first primary node, the second primary node, and the replica nodes are implemented as part of a network-based database service that hosts the database on behalf of one or more clients of the network-based database service.

\* \* \* \* \*